United States Patent [19]
Petitbon

[11] Patent Number: 4,814,575
[45] Date of Patent: Mar. 21, 1989

[54] METHOD OF SURFACE-TREATING CERAMIC WORKPIECES USING A LASER

[75] Inventor: Alain Petitbon, St Arnoult en Yvelines, France

[73] Assignee: Compagnie Generale d'Electricite, Paris, France

[21] Appl. No.: 109,137

[22] Filed: Oct. 16, 1987

[30] Foreign Application Priority Data

Oct. 16, 1986 [FR] France ................................. 8614381

[51] Int. Cl.⁴ ............................................. B23K 26/00
[52] U.S. Cl. ........................... 219/121.64; 219/121.84; 219/121.85
[58] Field of Search ................... 219/121 LE, 121 LF, 219/121 FS, 121 LW, 121 L, 121 LM, 121.65, 121.66, 121.84, 121.8, 121.6, 121.85; 427/140; 29/402.18

[56] References Cited

U.S. PATENT DOCUMENTS

| | | | |
|---|---|---|---|
| 2,803,559 | 8/1957 | Rutherfurd et al. | 427/191 X |
| 3,244,412 | 4/1966 | Robinson et al. | 219/121 LE X |
| 4,299,860 | 11/1981 | Schaefer et al. | 219/121 LE X |
| 4,732,778 | 3/1988 | Kawasaki | 427/53.1 |

FOREIGN PATENT DOCUMENTS

| | | |
|---|---|---|
| 510038 | 3/1952 | Belgium . |
| 2575185 | 6/1986 | France . |
| 83120 | 2/1981 | Luxembourg . |
| 84971 | 8/1983 | Luxembourg . |
| 1201911 | 8/1970 | United Kingdom . |

*Primary Examiner*—C. L. Albritton
*Attorney, Agent, or Firm*—Sughrue, Mion, Zinn, Macpeak & Seas

[57] ABSTRACT

A carbon dioxide laser (4) directs a beam (6) onto a ceramic workpiece to be treated (18), which workpiece moves along arrow (20). A carrier gas injector (14) injects a moderate throughput of spheroidized powder of a ceramic material into said beam. After melting and solidifying, the layer (24) after has microcracks which are smaller than they would have been if there had been no projected powder. The method is applicable to the construction of heat engines.

9 Claims, 1 Drawing Sheet

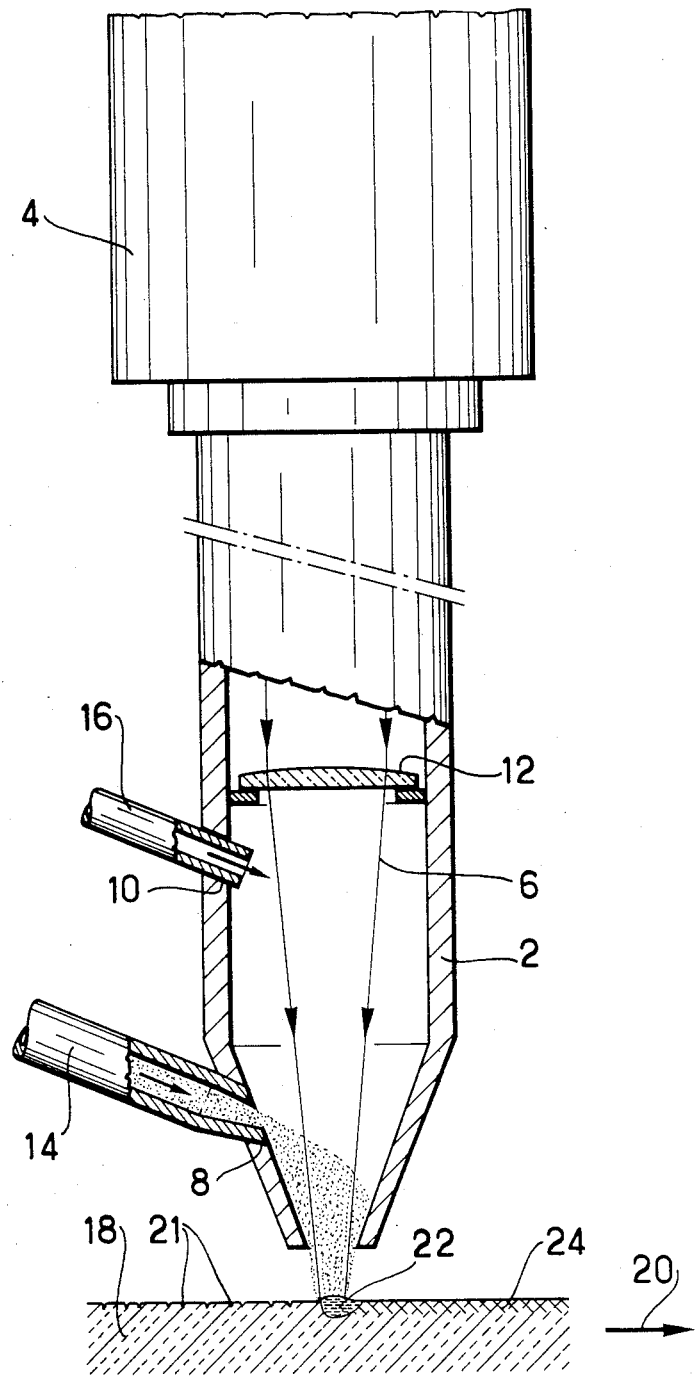

METHOD OF SURFACE-TREATING CERAMIC WORKPIECES USING A LASER

FIELD OF THE INVENTION

The present invention relates to workpieces constituted by a high melting point ceramic material such as alumina and above all such as zirconia. It seeks to improve the qualities of such workpieces, and in particular their mechanical qualities. Such workpieces are hereinafter referred to as ceramic workpieces. They may be in the form of a homogeneous individual workpiece, or else they may be constituted by a ceramic layer deposited on a support made of some other material.

BACKGROUND OF THE INVENTION

The use of ceramic materials in heat engines and in protective plating is limited by the fragility thereof (a tendency to crack under stress). Progress made in the manufacture of such materials has made it possible to reduce internal defects to a great extent. As a result, if forces are applied up to close to the breaking point of workpieces made of such improved materials, such breaks as do occur develop from surface defects such as pores and cracks, which defects appear to be more difficult to eliminate than internal defects.

Such pores and cracks may give rise to other drawbacks, for example they may constitute attachment zones for organic molecules which may be a nuisance, in particular in biochemical processes. In order to get rid of pores and cracks so as to improve the qualities of a ceramic workpiece, there exists a process of treatment by surface melting using a laser.

The $CO_2$ laser, in particular, is a remarkable tool for curing surface defects. It operates by high-speed melting and cooling, thereby giving rise to very fine and homogeneous microstructures, but unfortunately suffering from a very dense network of random microcracks which degrade the mechanical properties of the material. These microcracks are about 2 micrometers wide and about 500 micrometers long.

These microcracks form during cooling and they appear to be due, in particular, to expansion and contraction differences between the molten zone and the solid zones which are adjacent or underneath. These differences increase with increasing ceramic melting temperature and with materials having high sensitivity to thermal shock, which implies that very highspeed laser treatment is required in order to avoid heating the core of the workpiece. Such microcracks give rise to the same drawbacks as described above with reference to pores and cracks, but to a different extent.

One such known process is described in patent document LU-A-83 120 - Centre de Recherches Métallurgiques. This document proposes prior deposition of an oxide layer. It appears to envisage an oxide which is different from that which constitutes the material to be treated.

In general, the solutions which are currently proposed for solving this problem of microcracking consist in prior chemical, modification of the surface of the workpiece. This modification may be obtained by depositing a suitable material on the surface of the ceramic to be treated. Such pre-treatment runs the risk of making the process difficult to reproduce and too expensive for industrial implementation.

The following articles may be read on this topic in the journal "Materials Science Research" volume 17, Plenum Press, New York 1984:

* Laser Processing of Ceramics J. R. Spann et al., US Naval Research Laboratory; and
* Microstructural Analysis of Rapidly Solidified Alumina J. P. Pollnger and G.L. Messing, Pennsylvania State University.

Tests performed by the present inventor, have shown in particular, that commercial alumina or zirconia ceramics withstand laser treatment (i.e. do not subsequently show signs of degradation due to thermal shock) only if the interaction time is very short (a few hundredths of a second, and not more than 0.10 s in more cases).

Give such reaction times, the solutions suggested in the above-mentioned publications appear to be at least difficult to implement, particularly concerning the formation of solid solutions, of eutectics, or of new compounds.

Patent document LU-A-84 971 - Centre de Recherches Métallurgiques, describes a method of depositing a refractory material by projecting a powder which is heated, in particular during its trajectory, by a laser beam. Such a method forms an additional layer which increases the thickness of the workpiece to which it is applied and which still suffers from the abovementioned pores and cracks.

Preferred implementations of the present invention make it possible to obtain ceramic workpieces which are rendered capable of withstanding higher forces than before by virtue of laser surface treatment.

Preferred implementations of the invention also seek to reduce the sizes and/or the number of microcracks in the surface of a laser-treated ceramic workpiece, so as to reduce the mechanical and/or physico-chemical drawbacks related to these microcracks.

SUMMARY OF THE INVENTION

The present invention provides a method of surface treating ceramic workpieces by means of a laser, the method being applicable to a workpiece to be treated constituted by a base ceramic material including surface cracks and/or pores, the method including the step of scanning at least a portion of the surface of the workpiece to be treated with a heating laser beam in order to provide a melt zone in which the temperature is locally raised above the melting temperature of the material, in such a manner that, at each point of the treated surface, the melting and subsequent cooling of a surface layer give rise to a microstructure in said layer which is finer and/or more homogeneous than before, said method being characterized by the fact that it includes projecting a ceramic powder onto the workpiece to be treated in the heating laser beam, in such a manner that the projected powder arrives in the melted state in said melt zone with the throughput of said powder being chosen to be high enough to add on a sufficient quantity of ceramic material to fill at least 50% by volume of the initial surface cracks and pores in the base material when in the solid state, thereby at least partially avoiding the formation of shrinkage microcracks on cooling, and said throughput also being chosen simultaneously to be small enough for the heating power absorbed by the melting of said powder to be less than the heating power absorbed by melting the molten surface layer of said base material, thereby ensuring that said molten powder is integrated homegeneously in the base material.

It appears that in accordance with the invention microcracks are reduced by laser implantation (their total elimination is not desirable, since the presence of a few microcracks is advantageous for increasing the toughness of the material), i.e. by projecting a small amount of ceramic powder into a laser beam so that the powder arrives in the molten state on the surface to be treated and at least partially compensates for the shrinkage related to the pores contained in the surface prior to treatment being filled, without giving rise to significant increased thickness.

The material which is applied may be of the same nature as the material of the workpiece being treated, or it may be different in nature. Not only does adding the material while molten limit subsequent shrinking, but also it reduces the coefficients of expansion and contraction.

The projected material may also contribute to putting the surface into compression relative to the core of the workpiece, thereby limiting the propagation of cracks formed under stress.

In accordance with the present invention, it also appears advantageous, at least in some cases, to adopt the following more particular dispositions:

the throughput of said projected powder is such that the melting of said powder absorbs between 1% and 40% of the available power of said heating laser beam;

the throughput of said projected powder is chosen to be between 5 mg and 125 mg per kilojoule of heat conveyed by said heating laser beam;

the throughput of said projected powder is chosen to be between 10 mg and 60 mg per kilojoule of the heat conveyed by said heating laser beam;

said projected powder is a powder which has previously been spheroidized;

when said base material is zirconia, said projected powder is alumina powder and/or zirconia powder;

the grains of said projected alumina powder and/or zirconia powder have diameters lying between about 50 micrometers and 150 micrometers;

said projected powder is projected in suspension in a carrier gas.

BRIEF DESCRIPTION OF THE DRAWING

An implementation of the present invention in the above-described context is described in greater detail below by way of non-limiting example and with reference to the accompanying diagrammatic FIGURE. The implementation described includes the dispositions mentioned above as being advantageous in accordance with the present invention. It should be understood that the items mentioned may be replaced by other items which perform the same technical functions.

The sole FIGURE is a fragmentary section through apparatus for implementing the method in accordance with the invention.

MORE DETAILED DESCRIPTION

As shown in this FIGURE, the carrier gas entraining said applied powder is itself applied under pressure to an outlet nozzle 2 from a laser 4 which produces said heater beam 6. The zone 8 where insertion takes place is situated downstream i the beam direction from a zone 10 in which a sweeping and window-protecting gas is inserted. This zone 10 is itself situated downstream from a laser outlet window 12 lying in a section of said outlet nozzle.

This device is analogous to that used for laser deposition of a ceramic layer. However, amongst other differences, the throughput of applied powder is much lower in accordance with the invention than would be required for depositing such a layer, and the thickness of the workpiece is not altered.

In the device shown, the laser outlet window is constituted by a focusing lens 12 for focusing the beam 6 formed by a carbon dioxide gas laser 4.

The carrier gas and the sweeper gas are inserted into the nozzle 2 via a powder injector 14 and a tube 16.

The direction of displacement of the ceramic workpiece to be treated 18 is shown by an arrow 20, with the laser 4 being fixed, for example. Cracks 21 are shown highly diagrammatically on the surface of said workpiece. The impact of the laser beam sets up a melt zone 22 on said workpiece. The solidified layer after melting is referenced 24.

Powder feed is provided by a powder dispenser (not shown) which receives a spheroidized powder having a narrow range of particle sizes.

For ceramics such as alumina and zirconia, spheroidization is performed by spray-drying a slip, with heating to eliminate binders and screening to obtain a good range of particle sizes (typically from 50 to 100 micrometers).

In order to melt the powder and the surface to be treated simultaneously without thermal shock degrading the workpiece to be treated, and when spraying alumina or zirconia on workpieces made of alumina, zirconia, silicon nitride or SiAlON, mullite, or cordierite, the operating parameters may lie in the following ranges:

laser power 6 to 12 kW/cm$^2$
laser energy density 0.2 to 1 kJ/cm$^2$
scanning speed 1 to 20 cm/s
powder throughput 1 to 5 grams/min, i.e. 5 to 25 mg/cm$^2$ A first example is treating partially stabilized zirconia (PSZ) by spraying on powdered alpha alumina. A 3 kW stable cavity continuous $CO_2$ laser is used having a partially focused beam in order to provide a spot which is 4 mm in diameter and having quasi-uniform energy distribution. The zirconia workpiece (a 50×50 mm zirconia plate trademark Desmarquest and stabilized using magnesia) is fixed on a digitally-controlled X, Y, Z table. The powder dispenser is adjusted to dispense 2 or 3 grams/min of powdered alumina which is screened to lie in the range 50 micrometers to 150 micrometers. The laser power is 1.5 kW and the scanning speed is 5 cm/s (giving an interaction time of 0.08 s).

The following results are obtained:

polyphase microstructure over 1 to 5 micrometers (an intimate mixture of cubic and quadratic $ZrO_2$, with alpha and delta $Al_2O_3$);

limited microcracking with the microcracks oriented perpendicularly to the direction of displacement; and an increase in toughness and in Vickers hardness (+40%) compared with the non-treated zones (with toughness being difficult to measure in the non-treated zones because of the numerous defects existing therein).

By way of comparison, melting the same sample without projecting any powder thereon performed using an 800W beam (with the same 4 mm diameter) at a scanning speed of 10 cm/s, gives:

a single phase microstructure over 1 to 2 micrometers (cubic ZrO$_2$);

numerous random microcracks; and a reduction in Vickers hardness (−50%) and in toughness (not measurable compared with the zones that are not treated.

A second example concerns treatment of a layer of yttrium stabilized zirconia (YSZ) having a thickness lying in the range 0.5 mm to 3 mm. This layer is deposited by plasma torch projection onto cast iron together with an underlayer of NiCrAlY.

Before laser treatment, the layer had 10% porosity and 6 GPa hardness.

After laser treatment with alumina projection in accordance with the invention, the porosity was nil and the hardness lay between 14 GPa and 15 GPa.

As a result a layer is obtained having a sealed surface which is resistant to corrosion, abrasion, and thermal shock. Such layers may be used as thermal barriers or as anti-wear layers in diesel engines or in turbines.

I claim:

1. A method of surface treating ceramic workpieces by means of a laser, the method being applicable to a workpiece to be treated constituted by a base ceramic material including surface cracks and/or pores, the method including the steps of:

scanning at least a portion of the surface of the workpiece to be treated with a heating laser beam in order to provide a melt zone in which the temperature is locally raised above the melting temperature of the material, in such a manner that, at each point of the treated surface, the melting and subsequent cooling of a surface layer give rise to a microstructure in said layer which is finer and/or more homogeneous than before; and projecting a ceramic powder onto the workpiece to be treated in the heating laser beam, in such a manner that the projected powder arrives in the melted state in said melt zone, with the throughput of said powder being chosen to be high enough to add on a sufficient quantity of ceramic material to fill at least 50% by volume of the initial surface cracks and pores in the base material when in the solid state, thereby at least partially avoiding the formation of shrinkage microcracks on cooling, and said throughput also being chosen simultaneously to be small enough for the heating power absorbed by the melting of said powder to be less than the heating power absorbed by melting the molten surface layer of said base material, thereby ensuring that said molten powder is integrated homogeneously in the base material.

2. A method according to claim 1, wherein the throughput of said projected powder is such that between 1% and 40% of the available power of said heating laser beam is absorbed by melting said projected powder.

3. A method according to claim 1, wherein the throughput of said projected powder is chosen to be between 5 mg and 125 mg per kilojoule of heat conveyed by said heating laser beam.

4. A method according to claim 3, wherein the throughput of said projected powder is chosen to be between 10 mg and 60 mg per kilojoule of the heat conveyed by said heating laser beam.

5. A method according to claim 1, wherein said projected powder is a powder which has previously been spheroidized.

6. A method according to claim 1, wherein said base material is zirconia, and wherein said projected powder is made of at least one powder of the group consisting of alumina powder and zirconia powder.

7. A method according to claim 6, wherein the grains of said projected powder have diameters lying between about 50 micrometers and 150 micrometers.

8. A method according to claim 1, wherein said projected powder is projected in suspension in a carrier gas.

9. A method according to claim 8, wherein said carrier gas entraining said projected powder is injected under pressure into the outlet nozzle of a laser producing said heating beam, with injection taking place in a zone which is downstream in the beam direction, from a zone in which a sweeping and windowprotecting gas is injected, said zone being itself located downstream from an outlet window from said laser occupying a section of said outlet nozzle.

* * * * *